May 14, 1963
R. C. SHOEMAKER
3,089,270
SLIDE TITLE MEANS
Filed Sept. 21, 1959
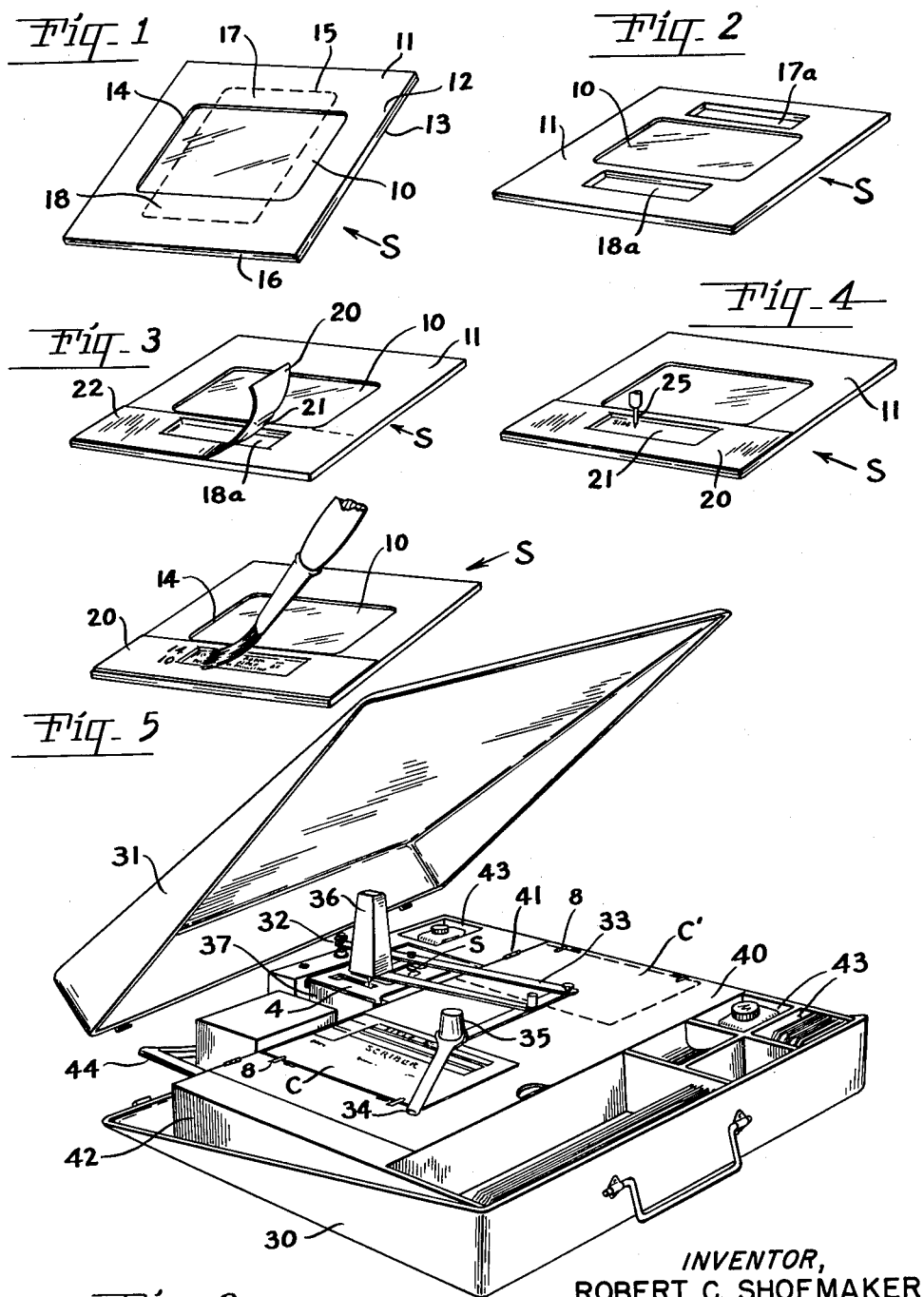
INVENTOR,
ROBERT C. SHOEMAKER
By
Attorney

United States Patent Office 3,089,270
Patented May 14, 1963

3,089,270
SLIDE TITLE MEANS
Robert C. Shoemaker, Portland, Oreg., assignor to Viewlex, Inc., Long Island City, N.Y., a corporation of New York
Filed Sept. 21, 1959, Ser. No. 841,236
3 Claims. (Cl. 40—158)

This invention relates primarily to slide title means for titling small projection slides so that the title will be projected on the screen adjacent the picture, but the invention also has broader application to the preparation of graphs, diagrams, charts, drawings, tables and such material in the main viewing area of a small slide for projection on a screen.

While the invention is not necessarily limited to any particular size of slide, it is of greatest advantage and fills the greatest need in connection with standard 35 millimeter transparencies which are far too small to accommodate the direct hand lettering of sufficient information to serve as a useful title for identifying and explaining the scene. Moreover, no space is provided for a title in the conventional mounting of such transparencies unless the title were to be superimposed on a part of the picture.

Titles and explanatory material have heretofore been placed on the slide frames where the title would not be projected on the screen but had to be read off to the viewers by the operator of the projector. Such an arrangement of tilting is difficult to read in a darkened room and, in any event, is no longer practical with the common use of magazine feeding devices which prevent inspection of the slides one by one as they are fed into the projector. It thus becomes necessary to provide titles which will be projected on the screen. Engraving and copying machines for other purposes have been found unsuitable for the tilting of small transparencies, and, obviously, the techniques once used in titling large lantern slides by the use of a typewriter or hand lettering are not applicable to 35 millimeter transparencies which is the size now in universal use.

It is, therefore, the general object of the present invention to provide an improved method and apparatus for lettering and drawing graphs and charts, and the like, on small transparencies for projection.

A more particular object is to provide an improved method and apparatus for titling 35 millimeter transparencies for projection.

Another object is to provide a method and apparatus for the purpose described suitable for use by the average person without requiring a high degree of skill.

Another object is to provide a convenient method for the purpose described which may be executed rapidly and without the use of liquids, chemicals or photographic processes.

Another object of the invention is to provide new and improved slide means.

Another object of the invention is to promote new and improved slide means comprising a frame having a picture opening and a title opening, a film in said picture opening with a photographic emulsion on one surface of the film, a title film on one face of said frame, a background coating on the exposed surface of said title film of suitable opacity, said title film extending over said title opening with that portion of said title film lying over the opening depressed into said opening to place said coating in the plane of said emulsion.

Another object of the invention is to provide slide title means using an opaque coating with the title engraved therein.

The method of the invention involves, first, the punching of an opening or window in the conventional cardboard mounting or frame used for 35 millimeter transparencies. Such opening is located in a position to receive light from the projector. A piece of coated film is mounted in the punched opening and then the desired title is inscribed on such film by a special pantograph mechanism concurrently with the hand lettering of the title in a designated space provided on an index card. A separate card is used for each slide, the title inscribed on the slide being an exact reproduction of the title lettered directly on the index card, whereby the latter may be incorporated in the filing system for the slides.

In a similar manner, tabulations, graphs, charts and drawings may be inscribed or drawn on the principal transparency of the slide concurrently with the lettering or drawing of such material on a card, or by tracing previously prepared material. This affords a rapid and convenient method of preparing slides for lecture purposes and the like without the inconvenience and expense of the photographic processes heretofore employed.

The foregoing and other objects and advantages will become apparent and the invention will be better understood from the following description with reference to the accompanying drawings illustrating the method and certain preferred embodiments of the apparatus. It will be appreciated, however, that different materials may be used in carrying out the method and various changes may be made in the construction and arrangement of the apparatus, all such modifications within the scope of the appended claims being included in the invention.

In the drawings:
FIGURE 1 is a perspective view of a conventional 35 millimeter projection slide containing a film transparency;
FIGURE 2 is a similar view showing how openings may be cut in the upper and lower margins of the cardboard frame to receive titles and descriptive material in accordance with the present invention;
FIGURE 3 is a similar view showing the application of a strip of film to receive the title;
FIGURE 4 is a similar view illustrating the step of inscribing the title;
FIGURE 5 is a similar view illustrating the step of coating the titled film strip;
FIGURE 6 is a perspective view of a self-contained kit having a preferred form of apparatus for inscribing the slides.

The Method

FIGURES 1 to 5 illustrate the steps of the method of titling a slide S. The numeral 10 designates a conventional 35 millimeter transparency mounted in a square frame 11 comprising two pieces of cardboard 12 and 13, each having a rectangular opening 14 to expose the picture portion of the transparency. The margins of the transparency are glued between the cardboard layers 12 and 13 whereby the transparency is protected on each side by the thickness of one layer of cardboard.

The projectors for such transparencies have a light opening in the shape of a cross so that the rectangular opening 14 may be placed in the projector in either horizontal or vertical position. The broken line rectangle 15 designates the position of opening 14 when the transparency is to be viewed in a vertical position. Thus, when the transparency is viewed in horizontal position, designating the near edge 16 of the frame as the bottom edge for reference purposes, there are unused portions of the light opening in the projector corresponding to the area 17 above the upper margin of opening 14 and the area 18 below the lower margin of opening 14.

FIGURE 2 illustrates how both unused areas 17 and 18 may be utilized for title and information purposes by punching additional rectangular openings 17a and 18a in the cardboard frame 11. When the picture is placed in the projector in horizontal position the projector will pass light through both of these openings as well as the main picture opening 14. Ordinarily, a single title opening is sufficient, and it is generally desired to place the title beneath the picture, so, for the present purpose, the opening 17a will be disregarded, and it will be assumed that only the single title opening 18a has been punched in the frame.

The title is placed on a strip of film or other suitable transparency 20 applied to the frame 11 over the opening 18a, as shown in FIGURE 3, and adhered thereto with a suitable adhesive. The portion of film 20 which registers with opening 18a is embossed or offset at 21 to project downwardly into the opening, as best shown in FIGURE 6. As shown in FIGURES 3 and 6, the slide is turned with the emulsion side of the main transparency 10 down, whereby the projector is focused in this picture plane to project the image with the sharpest definition of detail. The embossed portion 21 of the film strip 20 is, therefore, depressed so that its upper surface lies in the plane of the under surface of transparency 10. The reason for this is that it is desired to inscribe the upper surface of film strip 20 so that the lettering placed thereon will not be reversed with respect to the picture on transparency 10. The photographic image on the emulsion coated film is reversed if viewed from the emulsion side of the film. The embossing of strip 20 in the manner described thus places the inscribed matter in the picture plane and also has the further advantage of placing the title portion in a protected position adjacent the medial plane of the frame 11.

The same relationship obtains when the opening 18a is punched and the film strip 20 installed at the time of assembling the frame with the transparency 10. In such case, film strip 20 may be included between the two cardboard layers 12 and 13, and only slightly embossed to depress the portion 21 into the same relative position.

FIGURE 4 illustrates the next step of inscribing the title on the depressed upper surface of the embossed portion 21 of film strip 20. This step may be carried out in different ways, as will be explained hereinafter. In one method a film strip 20 is employed having an opaque or semi-opaque coating 22 on its upper surface, and the inscribing instrument being an engraving tool 25 to remove such coating and render the engraved portions transparent. In the engraving step, it sometimes happens that the engraving tool scars or gouges the surface of the film to some extent, creating uneven surfaces which refract or scatter the light of the projector and thus impair the projected image of the lettering.

Such damage is readily repaired by brushing the engraved surface lightly in a single stroke with acetone or other suitable film solvent, as shown in FIGURE 5. When only a small quantity of acetone is thus applied gingerly, it does not dissolve an appreciable portion of the film, but merely tends to smooth the surface to restore the original optical properties of the film and prevent objectionable refraction and scattering of light, whereby the lettering or other marks engraved through the coating 22 will be rendered clear and distinct. If desired, celluloid or other suitable transparent material may be dissolved in the acetone to provide a protective coating over the engraved title. Such solution forms a transparent filler which dries with a smooth surface eliminating any undesired optical effects produced by the engraving tool.

Various materials may be used for the coating 22. For example, the film strip 20 may be cut from sheets of masking film manufactured by Bourges Color Corporation, 80 Fifth Avenue, New York, N.Y., under the trademarks "Bourges Colotones" and "Bourges Solotones" overlay sheets. Such masking film has a thin coating which is sufficiently adherent to be durable for the present purpose and yet is readily removed in a cleancut pattern by an engraving tool of the type to be presently described. Such films are available with coatings of varying density and in grey or color to provide the desired opacity for the background. An exposed photographic film may be used but the emulsion coating is more difficult to remove by an engraving tool. The characteristics of the coating determine the nature of the engraving tool and the pressure which must be applied to remove the coating in cleancut lines or tracks.

Alternatively, of course, the inscribing instrument may be a pen capable of making an ink track on the film 20, or an ink eradicator type of fluid may be used to render transparent a stain or ink type of coating, but to be successful for the present purpose such a pen must be capable of drawing a very fine line. The advantage of an engraving tool is that the line may be made very narrow.

The requirement for fineness of line will be apparent from a consideration of the size of opening 18a which is available for title purposes in the frame of a 35 millimeter transparency. In a cardboard frame provided for use with a conventional projector the opening 18a cannot be larger than one inch long and one-fourth inch high. It is possible with the apparatus presently to be described to place three lines of lettering in this space, whereby it is apparent that the tallest letters must be somewhat less than one-sixteenth inch high. From a consideration of the height and configuration of different letters, it is determined that the open space in the loop of a lower case *e* in a three line title has a dimension of .011 inch. Such a letter is formed satisfactorily with a scribe line approximately .005 inch wide. Moreover, the precision of the equipment must be such that the lines are true and regular because the magnification of projection on a 48-inch screen is approximately 40:1.

Also, to obtain such reduction from a size of lettering that may be executed without requiring great skill on the part of the operator involves a reduction ratio in the pantograph mechanism of 1:4. The foregoing considerations make it apparent that methods and techniques heretofore employed on relatively large lantern slides not be adopted in the small slides using 35 millimeter transparencies and the like. The stated requirements also prevent the use of conventional engraving and copying machines which are employed for other purposes.

*The Kit*

Referring now to FIGURE 6, the complete tilting apparatus is contained in a portable kit having a case 30 with a removable hinged cover 31. Mounted on a supporting pivot 32 is a parallelogram pantograph linkage 33 having a manipulating handle 34 on a pen holder 35. The numeral 36 designates generally an inscribing instrument which is contained within a housing. Beneath the inscribing instrument is a light box 37 having a translucent ground glass top 38 equipped with suitable guide and clamp devices to hold the slide 11 in a predetermined position. A top panel 40 mounted on hinges 41 provides a working surface for the index card C, suitable clamp and positioning means being provided to hold this card in predetermined relationship with the title opening in slide 11. Space is provided in a box 42 under the hinged top 40 for storing the pantograph which is readily removable with its pivot 32 from a supporting socket.

A plurality of compartments 43 are provided in box 42 for slides, index cards, film strips 20 and other materials. Also contained within a suitable compartment under the cover 40 is a battery box holding dry cells to illuminate the light box 37 and energize certain electrical components presently to be described. Adjacent the light box is a punch 44 for punching the title openings, the punch being equipped with suitable guides and stops to properly position the slide frames for locating the title openings. The apparatus shown in FIGURE 8 thus constitutes a complete self-contained kit having its own power supply and all materials necessary for titling slides. Obviously, instead of using battery power, the electrical components may be energized by connection with house current, if desired.

Having now described my invention and in what manner the same may be used, what I claim as new and desire to protect by Letters Patent is:

1. A projection slide comprising a frame having a picture opening and a title opening, a film in said picture opening with a photographic emulsion on one surface of the film, a title film on one face of said frame, a background coating on the exposed surface of said title film of suitable opacity, said title film extending over said title opening with that portion of said title film lying over the opening depressed into said opening to place said coating in the plane of said emulsion.

2. A projection slide comprising a frame having a picture opening and a title opening, a film in said picture opening with a photographic emulsion on one surface of the film, a dished title film extending over the area of said title opening and depressed into said opening, and a background coating of suitable opacity on one surface of said title film covering said area which is exposed in said opening for projection, the distance of said depression of said title film into said title opening being such as to place said coating in the plane of said emulsion, said title film being insertable in said title opening from a face side of the frame.

3. A projection slide as defined in claim 2 including a title engraved in said coating.

References Cited in the file of this patent

UNITED STATES PATENTS

| | | |
|---|---|---|
| 469,033 | Allen | Feb. 16, 1892 |
| 643,981 | Robinson | Feb. 20, 1900 |
| 940,730 | Roovers | Nov. 23, 1909 |
| 1,210,215 | Satterlee | Dec. 26, 1916 |
| 1,376,677 | Coufal | May 3, 1921 |
| 1,410,130 | Sinclair | Mar. 21, 1922 |
| 1,568,674 | Knowles | Jan. 5, 1926 |
| 2,587,109 | Carroll | Feb. 26, 1952 |
| 2,697,889 | Heim | Dec. 28, 1954 |
| 2,699,606 | Breau | Jan. 18, 1955 |
| 2,748,017 | Hunt | May 29, 1956 |
| 2,881,521 | Pearson | Apr. 14, 1959 |

FOREIGN PATENTS

| | | |
|---|---|---|
| 710,676 | Great Britain | June 16, 1954 |